July 24, 1934. J. L. BARR Re. 19,247

DEVICE FOR DRIVING A VEHICLE SIDEWARD

Original Filed May 15, 1929 2 Sheets-Sheet 1

Inventor

JOHN L. BARR

By Semmes & Semmes

Attorney

July 24, 1934. J. L. BARR Re. 19,247
DEVICE FOR DRIVING A VEHICLE SIDEWARD
Original Filed May 15, 1929 2 Sheets-Sheet 2
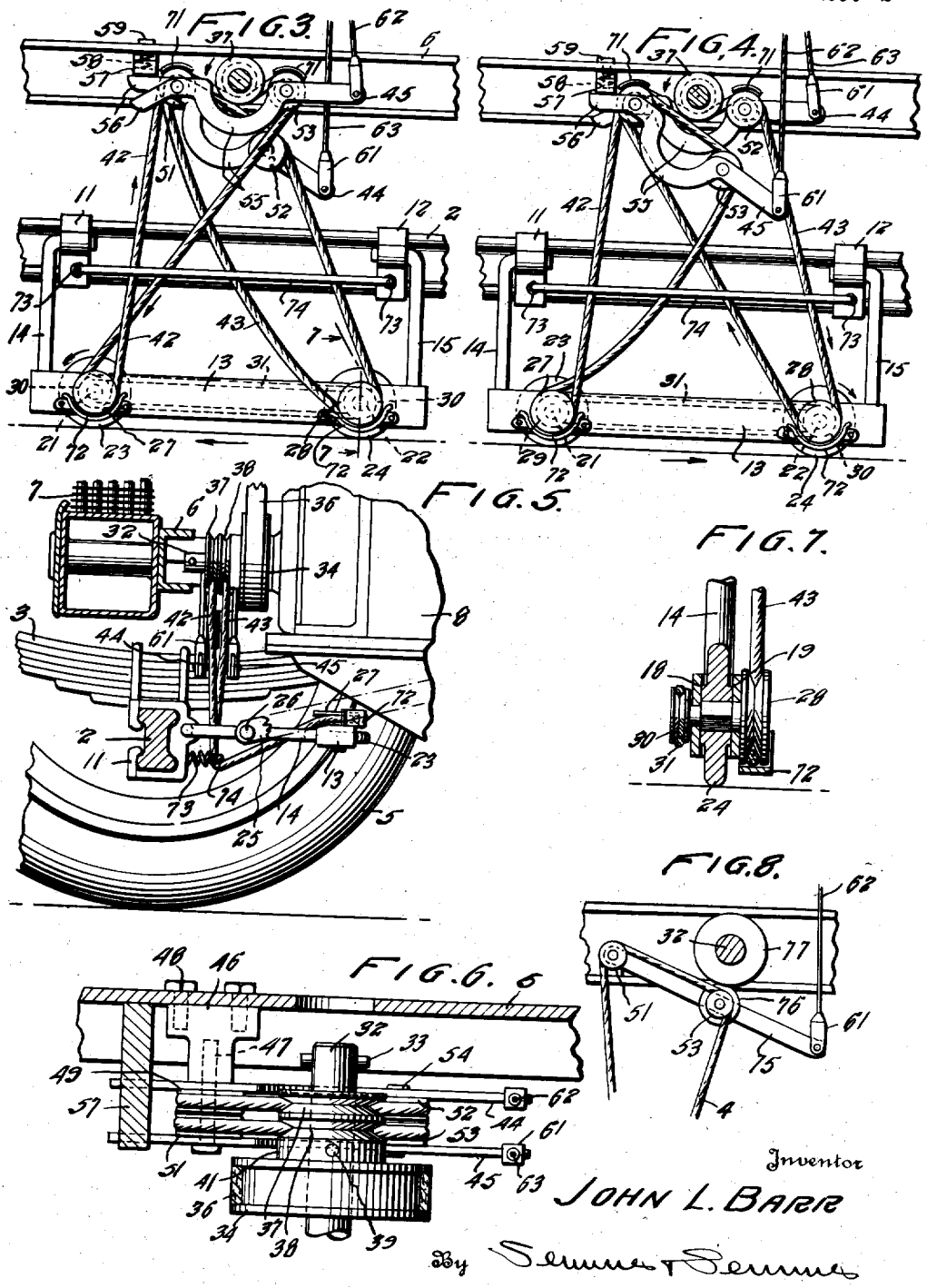
Inventor
JOHN L. BARR
By Semmes & Semmes
Attorneys Reissued July 24, 1934

Re. 19,247

UNITED STATES PATENT OFFICE 19,247

DEVICE FOR DRIVING A VEHICLE SIDEWARD

John Lester Barr, Chevy Chase, Md.

Original No. 1,954,308, dated April 10, 1934, Serial No. 363,172, May 15, 1929. Renewed February 23, 1933. Application for reissue May 14, 1934, Serial No. 725,669

4 Claims. (Cl. 180—1)

This invention relates in general to lifting devices and more particularly has reference to an apparatus for lending facility to turning the wheels with which the steering of a vehicle is effected while operating the same in confined areas and for driving the elevated end of the vehicle sideward when the front wheels are raised.

The apparatus forming the subject matter of this invention is a continuation in part of my copending application, Serial No. 350,685, filed March 28, 1929, and an improvement on my copending application, Serial No. 357,254, filed April 22, 1929.

Previous to this time in operating a vehicle in confined areas, such as are often encountered when parking on busy thoroughfares, extreme difficulty is sometimes experienced in turning the steering wheels of the car when momentarily stationary, while maneuvering for the desired positioning of the vehicle in a restricted area. In some circumstances, however, an available space is too confined for allowing the proper positioning of the vehicle by manipulation of the steering wheels.

In areas of sufficient dimensions to accommodate a vehicle, the rear end of the same may be directed into the space, although it is often impossible to similarly position the front end.

In my application first mentioned, I have provided a device for elevating the front wheels of a vehicle whereby the same may be easily turned in order to facilitate maneuvering for position in confined areas and in my succeeding application referred to, I have provided rotating members on the surface contact portion of my elevating device whereby in areas too confined for longitudinal movement the elevated end of the vehicle may be rolled sideward into a space of sufficient area to receive a car.

It will be apparent, however, that by reason of the high crown existing in many of the modern streets difficulty is sometimes experienced in attempting to remove the vehicle from a space in which it had been so positioned; also the necessity of alighting from the vehicle for pushing the same into a space may be attended by certain disadvantages.

An object of this invention is to provide an apparatus for simultaneously elevating the wheels by which steering of a vehicle is effected whereby the elevated end of the vehicle may be driven sideward.

Another object of this invention is to provide an apparatus for simultaneously elevating the wheels of a vehicle by which the steering is effected whereby the elevated end of the vehicle may be driven sideward by connection with the motor of the vehicle.

Still another object of this invention is to provide an apparatus for simultaneously elevating the wheels of the vehicle whereby the steering is effected which may be driven sideward at a variable speed by connection with the motor of the vehicle.

A further object of this invention is to provide an apparatus for simultaneously elevating the wheels of a vehicle by which steering is effected whereby the elevated end of the vehicle may be driven opposite to the normal longitudinal line of travel of the vehicle in either direction by connection with the motor.

A still further object of this invention is to provide an apparatus for relieving the weight of a vehicle from the wheels by which steering is effected, which is adapted to maintain the vehicle elevated by the weight thereof resting on the same.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification, Figure 1 is a side elevational view showing the apparatus forming the subject matter of this invention mounted on a conventional motor vehicle.

Figure 3 is a front elevational view showing the arrangement for rotating the wheels clockwise.

Figure 4 is a front elevational view showing the way of rotating the wheels counter clockwise.

Figure 5 is a side elevational view showing the apparatus raised to an inoperative position.

Figure 6 is a top view of the driving mechanism.

Figure 7 is a sectional view taken on line 7—7 of Figure 3.

Figure 8 is a front view of a modified form of drive.

Figure 1:
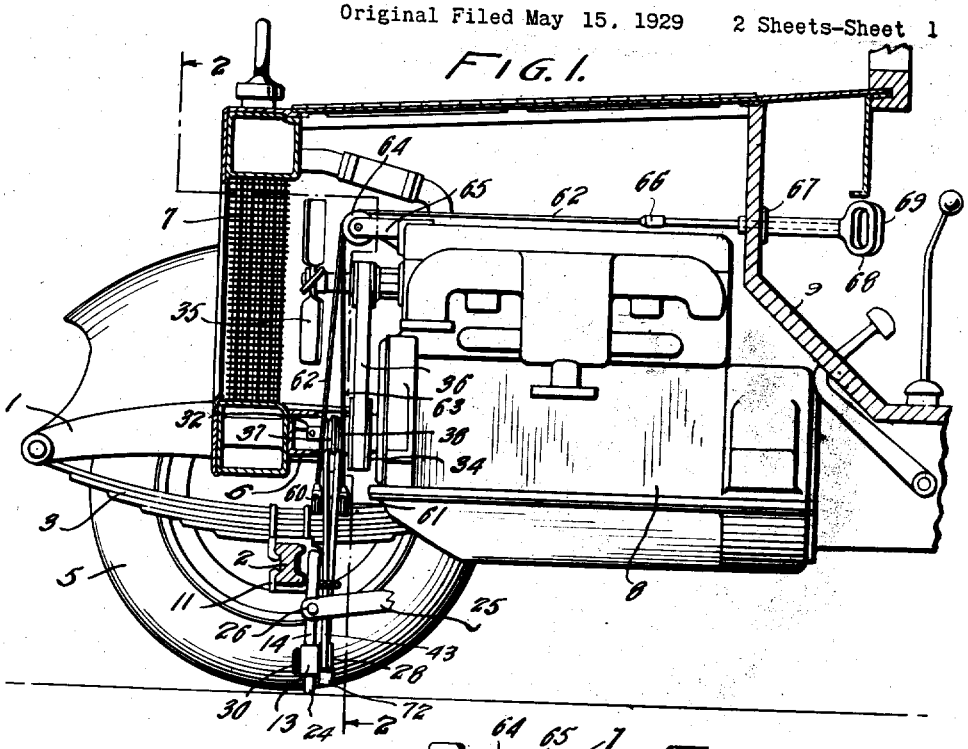
Figure 2:
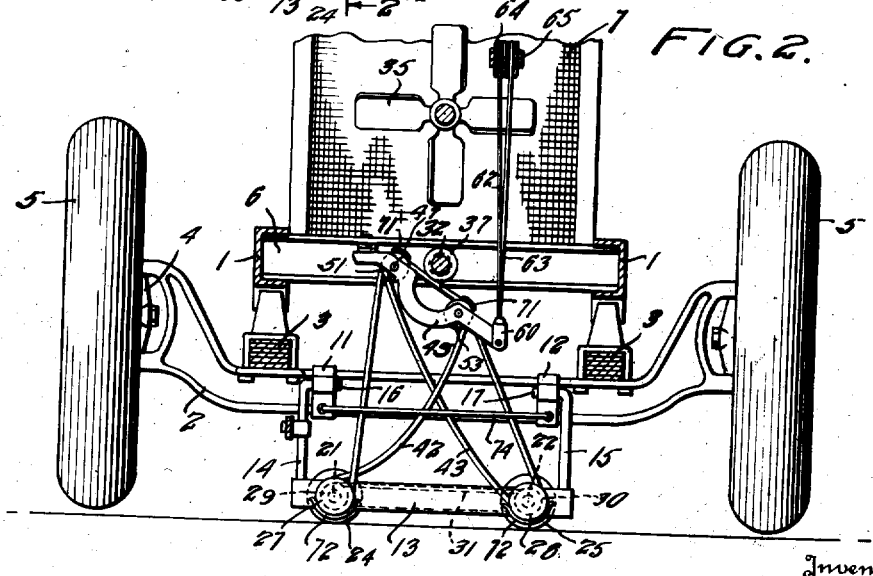
Figure 2 is a front elevational view taken on line 2—2 of Figure 1.

Referring more particularly by numerals to the drawings in which the same and similar elements are designated by like symbols of reference throughout and more especially to Figures 1 and 2, there is shown a conventional motor vehicle comprising side frame members 1, positioned on a front axle 2 through leaf springs 3 mounted thereon. The axle is bifurcated at each end, with stub axles 4 operating there between upon which are mounted wheels 5.

A front frame member 6 is mounted across the side frame member and likewise a radiator 7. An engine 8 is mounted on the frame in the conventional manner, and the driving compartment of the vehicle partitioned from the engine by the usual floor board 9.

A plurality of clamps 11 and 12 are mounted on the axle 2 at points equidistant from the longitudinal center of gravity of the vehicle. The clamps are provided with journals on the rear side adapted to receive the ends of a swinging support.

While the support illustrated in the drawings herein is deemed to be the most practical form for practicing this invention, it is apparent that any one of the several types of the supports with suitable modifications therein illustrated in my copending applications may be substituted for this type of support.

The support depicted herein comprises a base portion 13 in the ends of which are fitted upwardly extending arms 14 and 15. The arms are turned over at the top forming longitudinal arms 16 and 17 adapted to fit in the journals of the clamps 11 and 12. The base portion, as shown in Figure 7, is formed of adjacent spaced sides 18 and 19, each side having aligned journals at each end for receiving axles 21 and 22 on which are mounted rollers 23 and 24, respectively. The peripheries of the rollers extend below the bottom of the support so as to afford contact with the surface upon which the vehicle is resting when the support is lowered. I have already described in detail in my copending application upon which this invention is an improvement, the operation of a support of this character.

The support is normally carried above the clearance of the axle, as shown in Figure 5, and held in position by a snap lock or other retaining device operated in the driving compartment of the vehicle. When operating in confined areas of the character found in limited parking spaces, difficulty is often experienced in manipulating the steering wheels of a vehicle to maneuver the same into the desired position.

Under such conditions when it is advantageous to relieve the weight of the vehicle on the front tires to afford ease of turning the wheels, the support is lowered by release of the holding lever and the same allowed to contact with the roadway. The vehicle is then moved against the support, causing the base portion to grip the roadway and the front end of the vehicle to be brought up on the support, where, thus elevated, the wheels of the vehicle may be freely turned, preparatory to executing a subsequent maneuver. After turning the wheels the vehicle is than driven off the support, and the same operation repeated the necessary number of times until the vehicle has been properly positioned.

In the present invention the support is pivoted on the rear of the axle so that when the vehicle is elevated thereon the arms on passing over the center will contact with the bottom edge of the axle, maintaining the end of the vehicle in raised position by reason of the weight thereof on the support. The support may be further held, however, by locking the same in position by fixing an arm 25 having the end pivoted on strap 26 mounted on one arm of the support in the same manner as described in my copending application. Inasmuch as the support extends an equal distance across the longitudinal center of gravity the wheels will be evenly elevated.

The rollers 23 and 24 provided on the bottom of the support allow the elevated end of the vehicle to be moved sideward in the event that the space in which it is desired to position the vehicle is insufficient for allowing longitudinal movement of the same. According to the present invention the rollers are driven by the motor of the vehicle so that the elevated end may be moved in the desired direction by the operator of the car while in the driving compartment.

A plurality of pulleys 27 and 28 are fixed on the rear of each of the axles 21 and 22 and similar pulleys 29 and 30 fixed on the front ends of the axles. The pulleys 29 and 30 are connected through a belt 31 or other driving mechanism so that movement of one of the rollers 23 or 24 will drive the other in unison.

The crank shaft of the engine projects out of the forward part thereof and terminates in a stub 32, as shown in Figure 6. A transverse pin 33 is mounted in the end extending out on both sides for engagement with the crank. A pulley 34 is mounted on the crank shaft stub for operating a fan 35 through a belt 36, as shown in Figure 1.

According to this invention a plurality of pulleys 37 and 38 are fixed on the crank shaft stub in approximate vertical alignment with the pulleys 27 and 28 on the support when the front end of the vehicle is resting on the same. The pulleys 37 and 38 may be integrally constructed as shown in the drawings, and fixed on the stub by a pin 39 extending through a collar 41 also integrally formed on the side of the pulley 38.

It will be manifest that the arrangement of the pulleys on the stub will necessarily be subject to modification according to the particular assembly found in the various types of vehicles upon which it is desired to connect the device. In the mounting shown, the collar 41 integrally formed with the pulleys is juxtaposed against the pulley 34 operating the fan.

It is intended to connect the pulleys rotated by the crank shaft with those mounted on the bottom of the support through belts or other flexible driving mechanism 42 and 43. The belt 42 intended for engagement with the pulley 27 on the support and the pulley 37 on the stub, is crossed for operating the pulley 27 clockwise so as to move the elevated end of the vehicle to the right as shown in Figure 3. The belt 43 intended for connection with the pulleys 28 mounted on the bottom of the support and the pulley 38 rotating on the crank shaft stub, is intended to rotate the pulley 28 counter clockwise for moving the elevated end of the vehicle to the left, as shown in Figure 4.

The belt 43 is mounted over a plurality of pulleys 49 and 52 pivoted in alignment on an arm 44. The arm 44 is pivoted to the front frame member 6, as shown in Figure 6, on a bolt 47 fitted in a projection 46 attached to the frame by bolts 48.

The bolt 47 is also adapted to receive the pulley 49 and in addition a pulley 51 and an arm 45 corresponding to the arm 44. A pulley 53 is pivoted on the arm 45 opposite the pulley 52. The arms 44 and 45 are formed with curved portions 55 in the center and with stops 56 at one end. The stops 56 are adapted to contact with a block 57 held by a spring 58 which is fixed into position by a bolt 59 projecting through the frame. The opposite ends of the arms 44 and 45 are connected to clevises 61 fixed on the end of cables 62 and 63, better shown in Figure 1.

The cables are carried over pulleys 64 mounted on the head of the engine 8 on a frame work 65 and attached to pull levers 68 and 69, respectively, through connections 66. The levers extend through a guide 67 positioned above the floor board 9.

It will readily be perceived that in normal position the unattached ends of the arms 44 and 45 will project downwardly, the stops 56 resting against the block 57. By pulling either one of the handles 68 or 69, the respective arms will be raised and the belt passing over the pulleys mounted thereon brought in contact with one of the pulleys fixed on the crank shaft stub.

The operation of this invention may be readily understood by first having reference to Figure 5. The support formed by the arms 14 and 15 pivoted to the axle is normally carried in horizontal position above the clearance of the axle when use of the same is not desired. It may be so held by locking the lever 25 as has already been described in my copending application. A plurality of guards 71 are mounted on the arms 44 and 45 to prevent disengagement of the belts with the pulleys carried thereby and similarly guards 72, mounted on the base of the support likewise serve to maintain the belts in position on the pulleys 27 and 28 when the belts are loose by reason of the support being raised. Also a spring 73 is mounted on each of the clamps 11 and 12 on the ends of which are carried a cross rod 74. In this manner when the support is raised the rod 74 acts to hold the belts taut.

When use of the support is desired the same is lowered for contact with the ground and the vehicle driven backward, whereupon the rollers 23 and 24 positioned transverse to the longitudinal line of travel of the vehicle will grip the retaining surface and thus cause the vehicle to be raised upon the support. On continued backward movement of the vehicle the arms 14 and 15 of the support will pass over the center and contact with the edge of the axle, preventing further movement and maintaining the vehicle elevated by reason of the weight resting thereon. In this position the weight of the vehicle on the front tires is relieved and the steering wheels may be easily turned whereupon the car may be driven off the support by moving forward, and the operation repeated if desired.

If it is wished to move the vehicle sideward with the front wheels elevated, the end of the vehicle is raised in the manner already described, whereupon it may be pushed in either direction on the rollers 23 and 24 or by pulling either one of the handles 68 or 69, the belts 42 or 43 may be brought in contact with the pulley mounted on the crank shaft stub and the rollers thus driven by the motor.

If movement of the vehicle to the right is desired the lever 68 is pulled, whereupon the arm 45 is raised and the belt 42 brought in contact with the pulley carried by the crank shaft. The belt 42 is crossed and is adapted to move the roller 23 clockwise. Inasmuch as the rollers are connected by a belt 31 mounted on pulleys 29 and 30 rotating therewith, the same may be moved in unison. If movement of the vehicle to the left is desired, the arm 44, as shown in Figure 4, is raised by pulling the handle 69 connected to the arm 44 by the cable 63. The belt 43 engaging the roller 24 through the pulley 28 is thus caused to engage the pulley on the crank shaft.

It is of course to be appreciated that in operation the belts will not grip the pulley on the crank shaft so as to move at the same speed, but will merely slide with respect thereto, and by exerting the necessary pressure in pulling the handles, the elevated end of the vehicle may be moved to either side at a variable speed and only the distance necessary.

There is shown in Figure 8 another form of arm 75 carrying the pulleys over which the belts are mounted. In this construction the belt does not contact with the stub of the crank shaft but a roller 77 is substituted for the pulley carried thereby, described in the other figures. Also a roller 76 is fixedly carried by the pin on which the rollers 52 and 53 are mounted so that when the arm is raised the roller 76 is brought in contact with the roller 77 and the belts driven in a similar manner to that already described with reference to Figures 3 and 4. It will be apparent in this construction that wear occurs between the rollers 76 and 77 and not on the belts which are mounted out of friction contact with the crank shaft.

There is accomplished by this invention an apparatus for simultaneously elevating the wheels by which steering of a vehicle is effected whereby the elevated wheels may be easily turned or the raised end of the vehicle pushed or driven sideward at a variable speed by connection with the motor.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A device for moving one end of a vehicle sidewise comprising a support mounted on an axle of a vehicle for swinging movement from the horizontal past the vertical rollers mounted on the support transversely with respect to the longitudinal axis of the vehicle and pressure operated means to selectively drive the rollers in either direction from the crank shaft.

2. A device for moving one end of a vehicle sidewise comprising a support mounted on an axle of the vehicle for swinging movement from the horizontal past the vertical, means to lower and raise the support, rollers mounted on the bottom of the support transversely with respect to the longitudinal axis of the vehicle, flexible driving mechanisms actuating the rollers and means to selectively connect the flexible driving mechanisms to the crank shaft of the vehicle to drive the rollers in either direction.

3. A device for moving one end of a vehicle sidewise comprising a support mounted on an axle of a vehicle for swinging movement from the horizontal past the vertical, rollers mounted on the bottom of the support on each side of a point in a plane with the longitudinal axis of the vehicle and transversely with respect thereto, flexible driving mechanisms for driving the rollers in either direction, means to selectively connect the driving mechanisms by varying pressure on the crank shaft of the vehicle to move the elevated end thereof sidewise in either direction.

4. A device for moving the end of a vehicle sidewise comprising a support mounted on an axle of the vehicle for swinging movement from the horizontal past the vertical, means to raise and lower the support, rollers mounted on the support transversely with respect to the longitudinal axis of the vehicle, a plurality of pulleys coaxially mounted with respect to said rollers, a crank shaft having an extension, a plurality of pulleys arranged on said extension, flexible driving means connecting the two sets of pulleys and means to selectively connect the flexible driving means to the crank shaft to drive the rollers in either direction.

JOHN LESTER BARR.